United States Patent [19]

Suzuki

[11] 3,969,562
[45] July 13, 1976

[54] POROUS POLYMER FILM

[75] Inventor: Takashi Suzuki, Takatsuki, Japan

[73] Assignee: Matsushita Electric Industrial Co., Ltd., Osaka, Japan

[22] Filed: Dec. 24, 1974

[21] Appl. No.: 536,116

[30] Foreign Application Priority Data

Dec. 28, 1973    Japan .................................. 49-2853

[52] U.S. Cl. ............................... 428/155; 428/910; 428/141
[51] Int. Cl.² ........................................... D06N 3/04
[58] Field of Search ............ 161/160, 402; 428/910, 428/134, 135, 136, 137, 155

[56]           References Cited
           UNITED STATES PATENTS

| 3,725,520 | 4/1973 | Suzuki et al. ...................... 161/402 |
| 3,758,661 | 9/1973 | Yamamoto et al. ................. 161/402 |
| 3,765,999 | 10/1973 | Toyoda ............................... 161/402 |
| 3,773,608 | 11/1973 | Yoshimura et al. ................ 161/402 |
| 3,773,609 | 11/1973 | Haruta et al. ...................... 161/402 |
| 3,783,088 | 1/1974 | Yoshiyasu et al. .................. 161/402 |
| 3,801,404 | 4/1974 | Druin et al. ........................ 161/402 |
| 3,839,516 | 10/1974 | Williams et al. .................... 161/402 |
| 3,841,943 | 10/1974 | Takashi et al. ..................... 161/160 |

Primary Examiner—William J. Van Balen
Attorney, Agent, or Firm—Stevens, Davis, Miller & Mosher

[57]         ABSTRACT

A plane-oriented, open porous film consisting of 100 parts by weight of crystalline high molecular material and 1 to 300 parts by weight of material having a lower melting point than that of the crystalline high molecular material, including a number of flat, fine voids extending along the rectangular direction of the thickness in the film and fine arc-shaped fiber structures on the surface thereof. The film exhibits a high degree of electric insulation, a high mechanical strength and a high permeability to gas as well as to certain liquids.

6 Claims, 3 Drawing Figures

POROUS POLYMER FILM

The present invention relates to a porous film and more particularly to a porous film having a high mechanical strength comparable to that of a conventional orientation film, a high permeability to gas and to certain liquids.

As dielectric or insulative material for a power capacitor, a power cable, a communication cable or the like, a thin film insulating material of low loss and high breakdown voltage has been required. Under such a circumstance capability of impregnation of insulating oil and insulating gas, a high mechanical strength and other characteristics are required. As an example of the materials which satisfy the requirements, a porous thin film material having low dielectric loss such as polyolefins has been proposed, but it has been difficult to obtain such material having a high degree of fineness and a high breakdown voltage, which can take the place of prior art cellulose insulating paper.

In a packaging material industry, as a packaging material which can be sterilized by gas such as ethylene oxide or steam or by heat, a less expensive porous material having a high permeability to gas yet preventing the permeability of bacteria has been required.

In a field of medical treatment, a film having a high permeability to oxygen and/or carbon dioxide gas yet preventing the permeability of blood has been sought for use in artificial film type lung.

In the past, the following materials have been known as porous film materials primarily consisting of crystalline high molecular materials such as polyolefins and polyamides.

1. Non-woven material as represented by those produced by spun-bond process.
2. Paper-like material produced by a paper yarn machine.
3. Porous film produced by uniaxially orienting crystalline high molecular material.
4. Porous film produced by adding excess amount of inorganic filler material to crystalline high molecular material and bi-axially stretching the resultant product.

In the materials according to (1) and (2) above, when the synthesized high molecular material is rendered filamentous, the diameter of filament reaches as large as several microns at least resulting in the increase in the diameters of voids in the non-woven material or synthesized paper or resulting in too broadly distribution in the void diameter. As a result the breakdown voltage decreases and it is difficult to perfectly prevent the permeability of bacteria or blood. Accordingly such materials cannot be used in the applications mentioned above. While the material according to (3) above may possess the void diameter distribution as required for the above object, because of the uniaxially stretched film the mechanical strength in a direction perpendicular to the direction of the stretching is so low that a problem in practical use may easily occur. While the material according to (4) above may exhibit a similar external appearance of that of the product in accordance with the present invention, because of a high percentage of content of the filler material, it has a low breakdown voltage and a high dielectric loss and hence it is not suitable for the application under a high electric field strength. Moreover, since the filler material reduces the mechanical strength of the film, the strength of the complex material is considerably low to compare with that of the film consisting of polymer itself which constitutes a base.

It is an object of the present invention to provide a novel porous film having a high degree of electric insulating property, a high mechanical strength, a high permeability to gas and to certain liquids, which meet the requirements in a wide range of applications.

The porous film according to the present invention has a high mechanical strength and a high breakdown voltage because the materials themselves included form portions of the base of the porous material. Furthermore, since the inside of arc of arch fiber structure on the surface form aperture connecting with the voids in the film, a high permeability to gas is presented in spite of small void diameter.

Particularly, the porous film according to the present invention consists of 100 parts by weight of crystalline high molecular material and 1 - 300 parts by weight of material having a lower melting point than that of the crystalline high molecular material, and it is a plane oriented porous material of open void which includes therein a number of fine flat voids extending in the rectangular direction of the film thickness and includes at the surface thereof fine arch fiber structures.

The porous film of the present invention can be manufactured by a process in accordance with the present inventor's separate applications (Japanese Patent Application Nos. 66660/73 and 15789/74). Particularly, high molecular composition having fine phase-separated structure consisting of mixture of a high molecular crystalline material capable of being biaxially stretched and a material having a lower melting point (hereinafter referred to as blending material) is forcedly stretched at a low degree of stretching (hereinafter referred to as cool stretching) at a temperature not higher than the stretching temperature region of the crystalline high molecular material to cause the high molecular composition to appear whitening and to cause a number of fine cracks or crazings to appear in the composition. Thereafter, while maintaining a tension on the composition to prevent the whitening thereof from disappearing, the temperature of the composition is elevated to reach a proper temperature within the stretching temperature region of the crystalline high molecular material. Then, the bi-axial stretching (hereinafter referred to as hot stretching) is effected. The temperature is elevated above the melting point of the blending material in at least the final portion of the hot stretching process.

The cracks or crazings formed during the cool stretching function to form internal voids or surface fiber structures during the hot stretching. Since the cracks or crazings are primarily formed at the interface of the crystalline high molecular material phase and the blending material phase in the high molecular composition, and the dimension of the respective phases of the phase-separated structure ordinally produced is not greater than several tens microns, an extremely fine structured porous material is obtainable.

FIGS. 1 to 3 of the accompanying drawings show microscopic photographs taken by a scan-type electronic microscope for an example of the porous film according to the present invention, in which;

The magnification scale for respective pictures is 1000.

Figure 1:
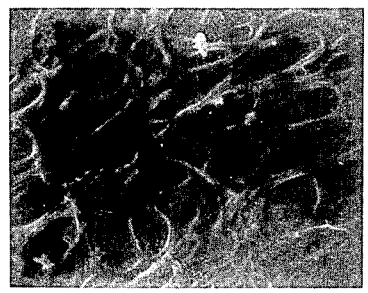
FIG. 1 shows a picture on a surface
Figure 2:
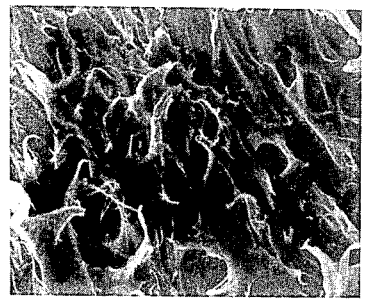
FIG. 2 shows a picture on cross section along a plane (strip plane)
Figure 3:
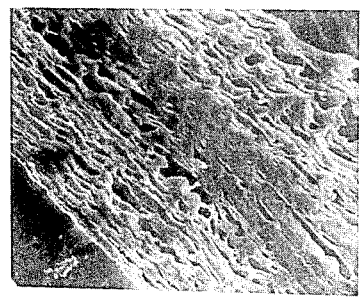
FIG. 3 shows a picture on cross section along the thickness.

As seen from FIG. 1, the porous film of the present invention comprises an arc-shaped fiber structure, the insides of the arcs defining voids formed by the break upon melting. The inside of the porous film of the present invention is of multi-layer structure having flat voids extending in the rectangular direction of the thickness, as shown in FIGS. 2 and 3. Since the blending material is rendered to molten state at the final portion of the stretching process, it is considered that it constitutes portions of the respective surface structures of the multi-layer structure. The respective voids are connected locally with each other and connect to atmosphere at the surface area to provide a so-called open porosity. This can be expected from the fact that the film is made transparent to the light for a short time by immersing the film in a liquid having a refractive index similar to that of the film forming material and which is compatible with the film base material, and that the film has a high permeability to gas.

The porous film of the present invention is constituted by the following materials; a crystalline polymer which forms a stretched structure of the film, that is, a framework of the film, a blending material required to form a high molecular composition primarily consisting of said crystalline polymer and having a fine phase-separated structure, and other additives. The crystalline polymer should be capable of being hot stretching and should have a crystallinity of more than 30%, which may be selected from, for example, crystalline polyolefin resin, either simple substance or copolymer primarily consisting of such simple substance, such as polyethylene, isotactic-polypropylene, isotacticpolybutene-1 and isotactic-poly-4-methylpentene-1; crystalline polyester resin, either homopolymer or copolymer primarily consisting of such simple substance, such as polyethylene terephthalate and polybutylene terephthalate; crystalline polyamide resin, either homopolymer or copolymer primarily consisting of such simple substance, such as nylon 6, nylon 66, nylon 11 and nylon 12, crystalline polyvinyl resin consisting of polyvinyl alcohol or copolymer primarily consisting of polyvinyl alcohol; and crystalline polyvinylidene resin, either homopolymer or copolymer primarily consisting of such simple substance, such as polyvinylidene chloride and polyvinylidene fluoride. Such crystalline polymer is preferably included in the film composition in an amount of 25 – 99% by weight. When the amount of the crystalline polymer is below 25%, the ability of forming the framework may be lost, and when the amount is above 99%, the local breakage does not occur on stretching.

The blending material should be capable of being rendered to molten state in at least a portion of the hot stretching temperature range of the framework forming crystalline polymer, and consists of at least one of polymers, oligomers and low molecular organic compounds, having lower melting point or lower pour point than those of the crystalline polymer, which is capable of being molten and mixed with the crystalline high molecular material without decomposition of volatilization, and preferably has a large compatibility, at least partially, with the crystalline polymer when the blending material is molten and mixed.

The blending material for the polyolefin resin may be selected from the group consisting of polyolefin resin other than the crystalline polyolefin forming the major part of the composition, silicone resin, silicon oil, polyamide resin, polyolefin oligomer, wax, fatty acid with a large number of carbon atoms, amide of fatty acid with a large number of carbon atoms, metallic soap, and etc.

Examples of the blending material when isotactic polypropylene is used as the crystalline polymer are; polyolefin such as polyethylene, isotactic polybutene-1, polyisobuthylene and ethylene-vinylacetate copolymer; polydimethyl siloxane, ethylene oligomer, paraffin wax, stearic acid, stearic acid amide, zinc stearate and cetyl palmitate. Among those the blending material having relatively wide range of stretching temperature and which facilitate the production of very fine structure is polyethylene.

The blending material suitable for the polyester resin may include polyolefin resin, polyamide resin, polyvinyl acetate, polyvinyl chloride and non-crystalline polyvinyl resin including copolymer thereof, polystyrene and polycarbonate. The blending material suitable for the polyamide resin may include polyvinyl resin, polyester resin, polyvinylidene resin, polyether resin such as polyethylene oxide and polyoxymethylene, and polyacrylic resin such as polymethyl methacrylate and polyethyl acrylate. The blending material suitable for the polyvinylidene resin may include polyvinyl resin, polyether resin and polyamide resin.

The blending material is preferably added to the film composition to the extent of 1 to 75% by weight. In addition to the framework forming crystalline high molecular material and the blending material, various additives may be included as required. Such additives may include inorganic filler, organic pigment, polymer, oligomer and low molecular organic compound having higher melting point or pour point than those of the framework forming crystalline high molecular material, antioxidant, thermal stabilizer, ultraviolet absorbing agent, flame retarder, antistatic agent or the like.

The additives are preferably included at less than 5% by weight based on the whole composition. The inorganic filler and the polymer of high melting point serve accelerator for nuclear formation of the crystalline high molecular material.

After the crystalline high molecular material, the blending material and the additives are properly selected, they are mixed in molten state or in solution and extruded into a sheet form or a cylindrical form to form the high molecular composition of fine phase-separated structure. The degree of stretching in the cold stretching is set to 1.02 – 1.5 and the high molecular material is rendered to appear whitening before necking is occured. The hot stretching is terminated at a temperature higher than the melting point or pour point of the blending material but a lower temperature may be used in the course of the stretching. In any case, it is necessary to elevate the temperature to the hot stretching temperature while maintaining a tension on the composition so as not to extinguish the whitening formed during the cold stretching. During the hot stretching, bi-axial stretching (including multi-axial stretching by inflation process) is effected sequentially or simultaneously. The degree of the stretching is preferably set to 1.5 – 10 for one direction and the ratio of longitudinal and lateral stretching is set to 1 : 5 to 5 : 1.

The typical structures of the porous film of the present invention are shown in FIGS. 1 to 3. While the mean diameter of the surface fibers, the size of the internal voids, the void content along the thickness (the number of voids in 1 mm length) may vary considerably depending upon the resin composition, mixing condition, stretching condition and etc., and usually the mean diameter of the surface fiber is 0.01 to 50 microns, the mean diameter of the void along the plane is 0.1 to 100 microns, the void content in the direction of the thickness is 10 to 10,000/mm. Typical characteristics of such a film are given below:

Void ratio : 5 to 80%
Tensile strength : 5 to 20 kg/mm²
Dielectric strength (in air, by D.C.): 150 to 350 V/micron
Dielectric loss (in air, at 60 Hz): 1.0 to 0.001%
N₂ gas permeability : 1 × 10³ to 5 × 10¹⁰ cc.cm/m² 24 hr.atm
Bacteria : Impermeable
Water : Impermeable under atmospheric pressure
Insulation oil : Permeable under atmospheric pressure The porous film of the present invention can be used in a wide applications such as electrical insulating material, sterilizing packaging material, diaphragm for artificial film type lung, and it has a high industrial value.

In order that those skilled in the art may better understand how the present invention can be practiced, the following examples are given by way of illustration and not by way of limitation.

EXAMPLE 1

20 Parts by weight of low density polyethylene were blended in molten state with 100 parts by weight of isotactic polypropylene. The mixture was formed into a sheet by T-die extrusion process and then subjected to a uni-axial stretching at a degree of stretching of 1.2 at a room temperature to appear whitening. The sheet was then heated to 140°C while being kept under tension. It was subjected to bi-axial stretching at 3 × 3 degree of stretching at 140°C to produce a porous film. FIGS. 1 to 3 show surface and cross section photographs of the resultant film, and the local breakages measured from the photographs indicated about 2500 breakages per square millimeters in the plane direction and about 1000 breakages per millimeter in the thickness direction.

EXAMPLE 2

1 Part by weight of mixture consisting of equal amounts of low density polyethylene and high density polyethylene was added to 100 parts by weight of isotactic polypropylene. After they were blended in molten state, the mixture was formed into a sheet, and then subjected to cold stretching in which it was folded over unidirectionally and continuously on a steel rod of small diameter to cause the whitening to appear. Then it was heated to 100°C under tension and stretching by at a degree of stretching of four in the direction of folding in the cold stretching. It was then heated to 130°C and stretch at a degree of stretching of five in transverse direction. The resultant film exhibited white, with pearl-like appearance and had a means diameter of surface fibril of 0.2 micron, a local breakage content of about 20,000 breakages per square milimeters in the plane direction and about 5,000 breakages per milimeters in the thickness direction.

EXAMPLE 3

50 Parts by weight of Esterresin 200 (a trademark for polyester copolymer manufactured by Toyoboseki Co., Japan,) were added to 100 parts by weight of nylon 66 and they were mixed in molten state at 280°C and the mixture was extruded to form a sheet. It was then folded over by a roll of small diameter at a room temperature to cause whitening to appear, and heated to 150°C under tension and subjected to bi-axial stretching at a degree of stretching of 2 × 2 at that temperature. The resultant film was opaque white and, and had the breakage content of about 2,000 breakages per square milimeters in the plane direction and about 500 breakages per milimeters in the thickness direction. It showed the tensile strength of 18 kg/mm², extension rate of 80% and apparent density of 0.85.

EXAMPLE 4

100 Parts by weight of polyethylene terephthalate, 10 parts by weight of polystyrene and 1 part by weight of Aerosil (a trademark for colloidal silica particles manufactured by Degussa Inc.) were mixed in molten state, and the resultant mixture was rolled by being passed between urethane rubber belts at 50°C to cause the whitening to appear. Then it was subjected to bi-axial stretching at a degree of stretching of 2.5 × 2.5 at 140°C and then heat treated at 170°C. The resultant film showed the breakage content of about 3,500 breakages per square milimeters in the plane direction and about 1,500 breakages per milimeters, and the apparent density of 0.97.

EXAMPLE 5

10 Parts by weight of polyvinyl chloride were added to 100 parts by weight of polyvinylidene fluoride and they were blended in molten state at 200°C. The resultant composition was subjected to stretching at a degree of stretching of 1.1 at a room temperature to cause the whitening to appear. Then it was subjected to bi-axial stretching at a degree of stretching of 2 × 2 at 165°C to form a porous film. The resultant film showed the breakage content of about 1000 breakages per square milimeters in the plane direction and about 200 breakages per milimeters in the thickness direction.

What is claimed is:

1. A plane-oriented, open porous film consisting of 100 parts by weight of crystalline high molecular material and 1 to 300 parts by weight of material having a lower melting point than that of said crystalline high molecular material, said film including a number of fine flat voids extending in the rectangular direction of the thickness in the film and fine arcshaped fiber structures on the surface thereof wherein said surface fiber has a mean diameter of 0.01 to 50 microns, the voids have a void mean diameter along the plane of 0.1 to 100 microns, and having a void content in the direction of the thickness of 10 to 10,000/mm.

2. A plane-oriented, open porous film according to claim 1 wherein said crystalline high molecular material is polyolefin resin, and said material of lower melting point is at least one material selected from the group consisting of other polyolefin resin, silicone resin, and polyamide resin.

3. A plane-oriented, open porous film according to claim 2 wherein said crystalline high molecular material is isotactic polypropylene, and said material of lower melting point is polyethylene.

4. A plane-oriented, open porous film according to claim 1 wherein said crystalline high molecular material is polyester resin, and said material of lower melting point is at least one material selected from the group consisting of polyolefin resin, polyamide resin, polyvinyl resin, polystyrene and polycarbonate.

5. A plane-oriented, open porous film according to claim 1 wherein said crystalline high molecular material is polyamide resin, and said material of lower melting point is at least one material selected from the group consisting of polyvinyl resin, polyester resin, polyvinylidene resin, polyether resin and polyacrylic resin.

6. A plane-oriented, open porous film according to claim 1 wherein said crystalline high molecular material is polyvinylidene resin, and said material of lower melting point is at least one material selected from the group consisting of polyvinyl resin, polyether resin and polyamide resin.

* * * * *